United States Patent [19]

Brown

[11] Patent Number: 4,919,214
[45] Date of Patent: Apr. 24, 1990

[54] CENTERLINE SIGHT

[76] Inventor: Sam J. Brown, Rural Route 3, Cozad, Nebr. 69130

[21] Appl. No.: 339,381

[22] Filed: Apr. 17, 1989

[51] Int. Cl.⁵ ............................................. A01B 69/00
[52] U.S. Cl. ....................................... 172/430; 33/264
[58] Field of Search ................... 172/430; 33/264, 286, 33/288, 227

[56] References Cited

U.S. PATENT DOCUMENTS

| | | | |
|---|---|---|---|
| 1,373,852 | 4/1921 | Allen | 172/430 |
| 2,198,864 | 4/1940 | DeGrelle | 172/430 |
| 2,538,112 | 1/1951 | Maier | 33/264 |
| 2,548,226 | 4/1951 | Maier | 33/264 |
| 2,555,954 | 6/1951 | Bruflat | 33/264 |
| 2,559,761 | 7/1951 | Fulton | 33/264 |
| 2,827,704 | 3/1958 | Hunsicker | 33/264 |
| 3,611,286 | 10/1971 | Cleveland | 172/430 X |
| 4,280,281 | 7/1981 | Gerber | 172/430 X |
| 4,393,596 | 7/1983 | Gerber | 172/430 X |
| 4,401,166 | 8/1983 | Brown | 172/430 |
| 4,511,005 | 4/1985 | Brown | 172/430 |

Primary Examiner—Randolph A. Reese
Assistant Examiner—Jeffrey L. Thompson

Attorney, Agent, or Firm—Zarley, McKee, Thomte, Voorhees & Sease

[57] ABSTRACT

A centerline sight device is mounted on a tractor to enable the driver to automatically steer the tractor along a center row or longitudinal mark to align the tractor with respect to furrows of crops in a field. The sight device includes a slight arm housing mounted on the forward end of the tractor, with a sight arm operably mounted on the housing to move transversely with respect to the longitudinal axis of the tractor. A motor is mounted on the sight arm housing to move the sight arm in response to selective activation by the tractor driver. A lamp assembly housing is mounted on the tractor forwardly of the seat and rearwardly of the sight arm, and has a plurality of lamps spaced transversely across the top perpendicular to the longitudinal axis of the tractor. The lamps are electrically connected to the motor and sight arm so as to light a particular lamp in response to the position of the sight arm. A plurality of switches are mounted directly below the lamps, and are electrically connected to the sight arm motor, so as to enable the tractor driver to selectively position the sight arm and form a sight line through a selected lamp and the sight arm for guiding the tractor.

6 Claims, 7 Drawing Sheets

CENTERLINE SIGHT

TECHNICAL FIELD

The present invention is directed generally to a row follower guidance apparatus for a tractor, and more particularly to a laterally adjustable centerline sight.

BACKGROUND OF THE INVENTION

In the past, a tractor operator generally used the center crease in the hood of the tractor as the sight for maintaining the tractor in its properly centered position relative to crop rows. It has been found, however, that there is a significant variation in the positioning of a tractor by different operators, because some people are right eye dominated and others are left eye dominated. The dominate eye is that used for establishing a single line of sight. Most operators align the tractor hood crease or ornament with the guide furrow for centering the tractor, but the lines of sight of a left eye dominated operator and a right eye dominated operator will result in substantially different positions of the tractor relative to the furrow.

To resolve this problem, the present inventor developed the furrow follower vision correction system described in U.S. Pat. No. 4,401,166. That system includes a laterally adjustable tractor sighting device which can be adjusted by various operators to accommodate their particular positioning on the tractor seat and dominate eye. Thus, by simple lateral adjustment of the sighting device, all operators can easily maintain a uniform and centered position of the tractor relative to planted rows of crops or any other visible centerline.

Whereas the device of U.S. Pat. No. 4,401,166 is believed to be a significant advance in the art, a problem is encountered with the use of this device since the driver must sit in the same position continuously throughout the operation of the tractor, in order to remain aligned.

It is therefore a general object of the present invention to provide an improved centerline sight for a tractor.

Another object is to provide a centerline sight for a tractor which is laterally adjustable to compensate for the various driving positions and dominate eyes of various operators.

A further object is to provide a laterally adjustable centerline sight which is simple and rugged in construction, inexpensive to manufacture and efficient in operation.

These and other objects of the present invention will be apparent to those skilled in the art.

SUMMARY OF THE INVENTION

The centerline sight device of the present invention is mounted on a tractor to enable the driver to automatically steer the tractor along a center row or mark to align the tractor. The sight device includes a sight arm housing mounted on the forward end of the tractor, with a sight arm operably mounted on the housing to move transversely with respect to the longitudinal axis of the tractor. A motor is mounted on the sight arm housing to move the sight arm in response to selective activation by the tractor driver. A lamp assembly housing is mounted on the tractor forwardly of the seat and rearwardly of the sight arm, and has a plurality of lamps spaced transversely across the top perpendicular to the longitudinal axis of the tractor. The lamps are electrically connected to the motor and sight arm so as to light a particular lamp in response to the position of the sight arm on the sight arm housing. A plurality of switches are mounted directly below the lamps, and are electrically connected to the sight arm motor, so as to enable the tractor driver to selectively position the sight arm as desired. The lamp assembly is mounted on the tractor in relation to the sight arm housing such that a driver sighting along one particular lamp and through the sight arm to a furrow or other mark on the ground forward of the tractor will steer the tractor into alignment with that centerline mark. The driver may select any one of a plurality of switches so as to cause the sight arm to move to an appropriate position wherein a sight line from the illuminated lamp through the sight arm will again align the tractor on the desired furrow or centerline mark.

DESCRIPTION OF THE PREFERRED EMBODIMENT

Figure 1:
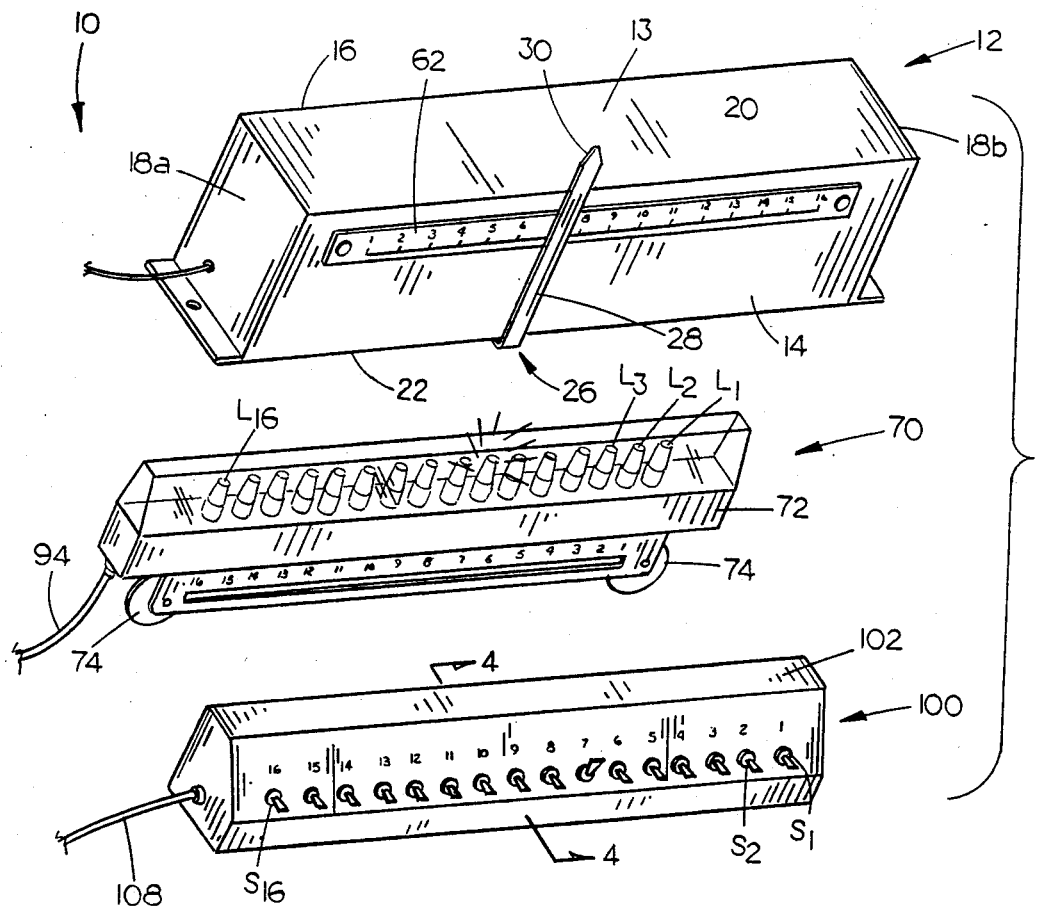
FIG. 1 is an exploded perspective view of the three major components of the present invention.

Referring now to the drawings, in which similar or corresponding parts are identified with the same reference numeral, and more particularly to FIG. 1, the tractor guidance apparatus of the present invention is designated generally at 10 and includes three major components, namely, a transversely adjustable sight apparatus 12, an alignment light indicator 70 and a selector switch assembly 100.

Sight apparatus 12 includes a housing 13 having forward and rearward walls 14 and 16, opposite ends 18a and 18b and top and bottom portions 20 and 22. A longitudinal slot 24 is formed in bottom 22 to allow a sight arm 26 to slide horizontally therethrough. Sight arm 26 includes an upstanding portion 28 with a pointed upper end 30 which is utilized in sighting as will be described in more detail hereinbelow. The lower end 28a of upstanding portion 28 is bent rearwardly and then upwardly to form a U-shape, with a rearward portion 32 which extends upwardly through slots 24. Thus, sight arm 26 is permitted to slide longitudinally in slot 24 from end 18a to end 18b on sight apparatus 12.

Figure 2:
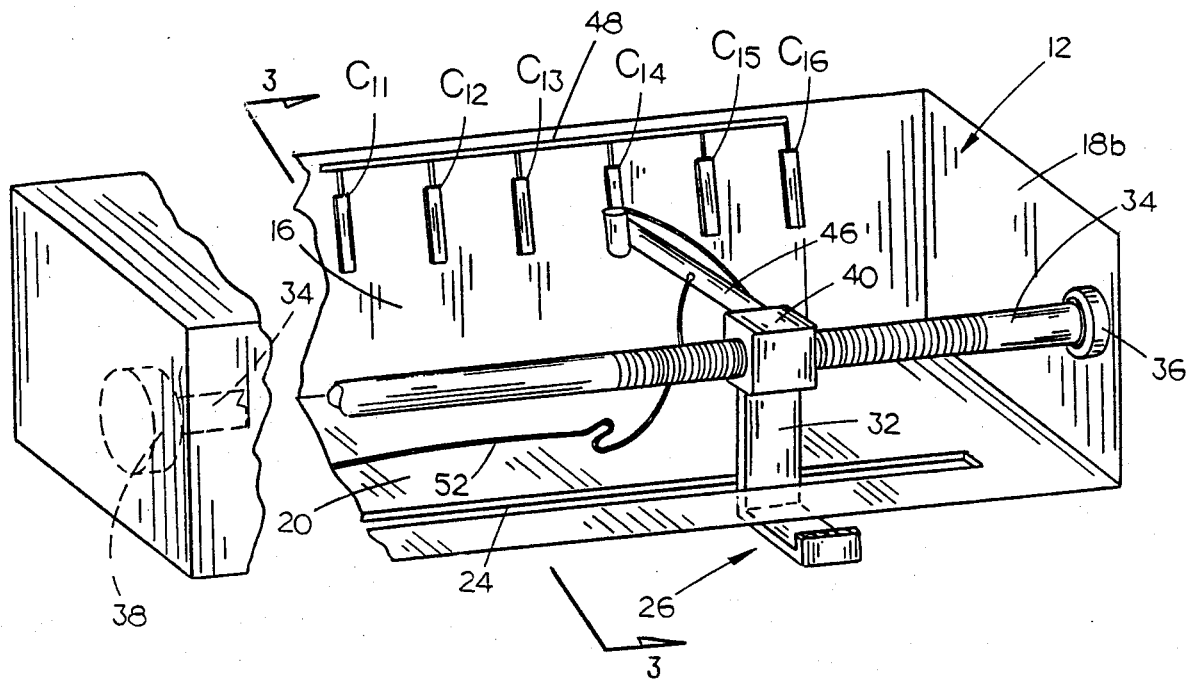
FIG. 2 is an interior perspective view of the sight arm housing of the invention.
Figure 3:
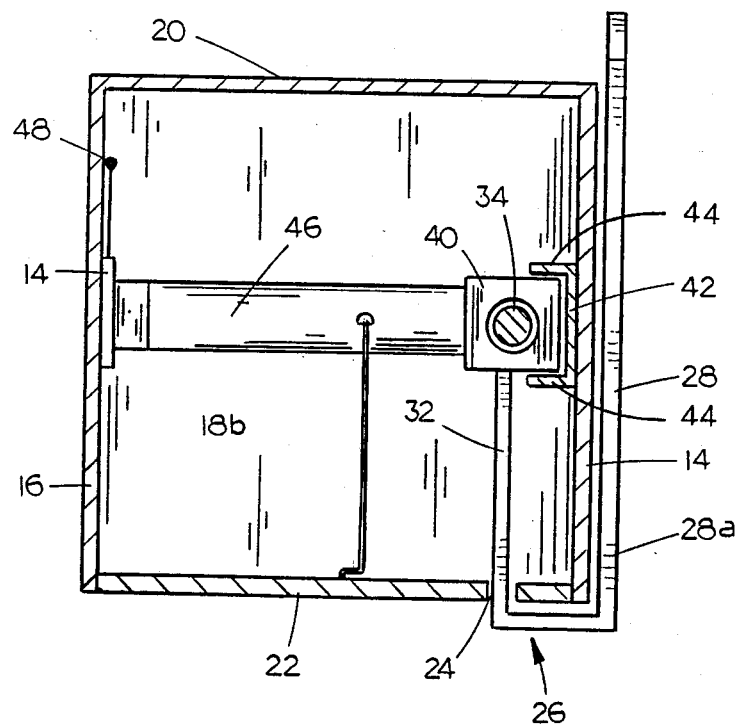
FIG. 3 is a transverse sectional view through the sight arm housing of the invention along section 3—3 of FIG. 2.
Figure 4:
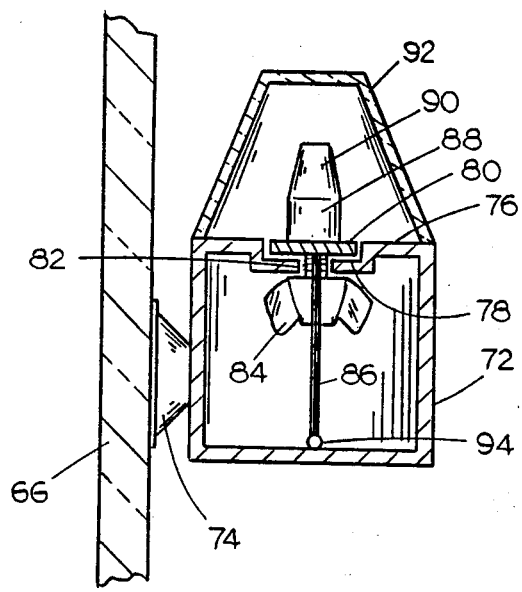
FIG. 4 is a transverse sectional view through the lamp assembly housing of the invention along section 4—4 of FIG. 1.

Referring now to FIGS. 2 and 3, a threaded shaft is rotatably mounted between ends 18a and 18b parallel to the front 14 and bottom 22. One end of shaft 34 is mounted within a bearing 36 on end 18b for free rotation, while the opposite end is mounted to a reversible motor 38 on end 18a. Rearward portion 32 of sight arm 26 is mounted to a threaded block 40 which is threaded on shaft 34. A U-shaped channel 42 is mounted on forward wall 14 of housing 12, parallel to shaft 34 with block 40 journaled within channel 42 for longitudinal slidable movement therein. Side walls 44 of channel 42 will prevent the rotation of block 40 when shaft 34 rotates, thereby causing block 40 to slide longitudinally in response to rotation of shaft 34 in either direction. Thus, operation of motor 38 in one direction or the other will cause sight arm 26 to move longitudinally along housing 13.

A resilient spring metal contact arm 46 is affixed to block 40 and projects against rearward wall 16. Contact arm 46 is formed of an electrically conductive metal and is resilient so as to bend slightly with contact against rearward wall 16. A series of sixteen vertically oriented and horizontally spaced-apart contact strips C1 through C16 are mounted on rearward wall 16 such that movement of block 40 will place contact arm 46 in electrical contact with contact strips C1 through C16. As will be discussed hereinbelow, each contact strip is located in one of sixteen positions upon which sight arm 26 may be aligned. Contact strips C1 through C16 are each electrically connected to a group of electrical leads, designated generally at 48, which lead to an electrical circuit 50 (see FIG. 6) which senses the position of sight arm 26. A power supply lead 52 extends from an electrical power supply (not shown) and is electrically connected to contact arm 46. Power supply lead 52 is of a length great enough to extend with movement of contact arm 46, from one end 18a to the other 18b in housing 13.

Figure 7:
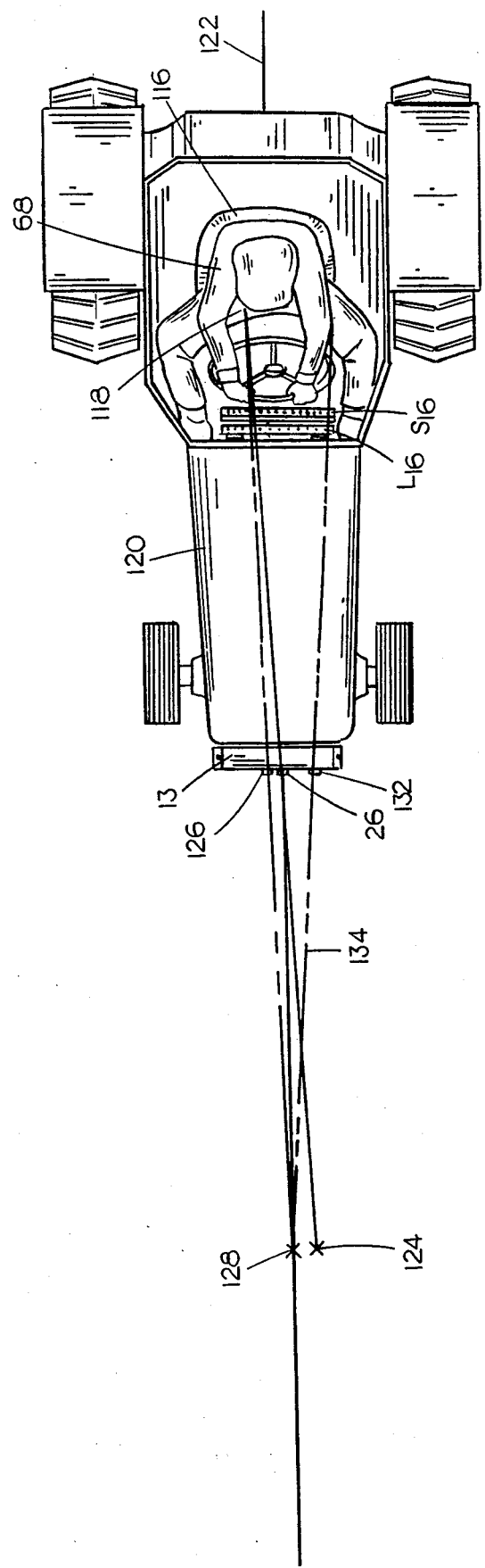
FIG. 7 is a top elevational view of the sight device mounted on a tractor.
Figure 8:
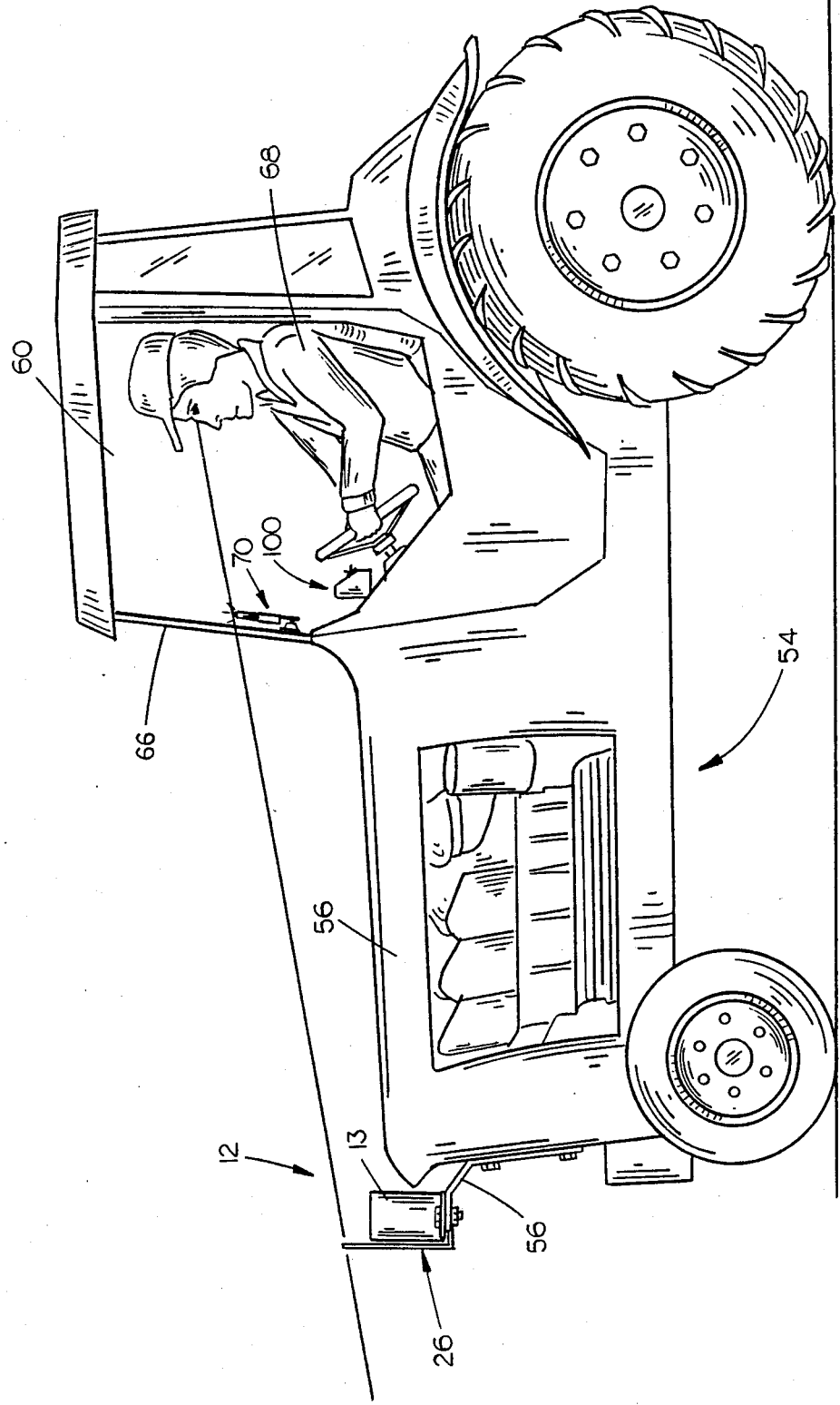
FIG. 8 is a side elevational view of the present invention mounted on a tractor.
Figure 9:
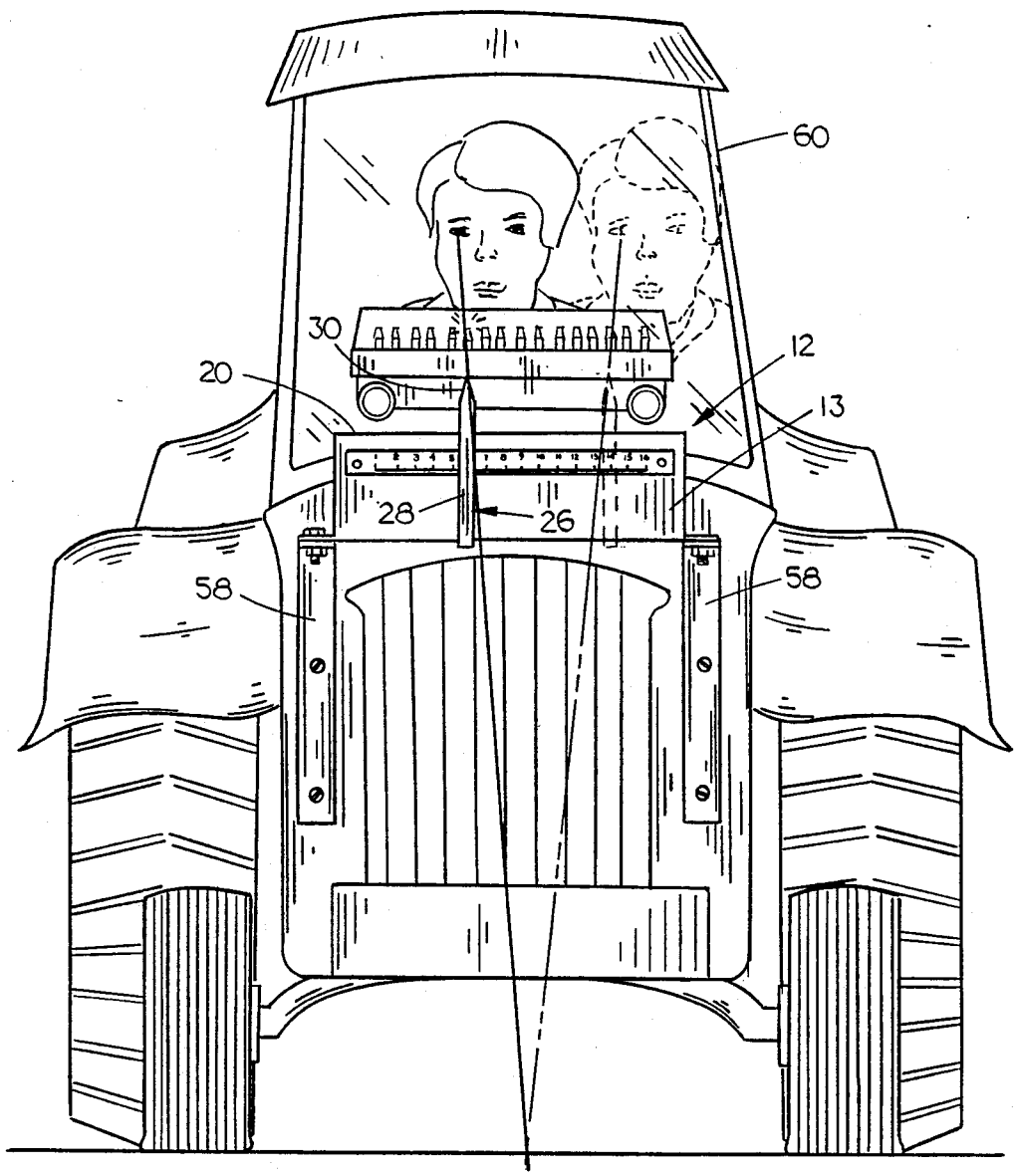
FIG. 9 is a front elevational view of the embodiment shown in FIG. 4.

As shown in FIGS. 7–9, sight apparatus 12 is mounted on a tractor at the forward end of the hood 56. Housing 13 is preferably mounted on a pair of brackets 58 which are then bolted to hood 56, such that housing 13 is oriented horizontally and generally centered on tractor 54. The upstanding portion 28 of sight arm 26 is of a height which will extend pointed end 30 upwardly beyond the top 20 of housing 13, such that pointed end 30 may be viewed from the cab 60 of tractor 54. An elongated strip 62 is mounted on forward wall 14 of housing 13 and has indicia 64 thereon which locates each of the sixteen positions for sight arm 26.

FIG. 7 illustrates the mounting of sight apparatus on a tractor, as previously indicated. Note that housing 13 is mounted centered on the longitudinal centerline of the tractor, and that sight arm 26 will move transversely to opposite sides of the tractor's centerline.

The alignment lamp assembly 70 is affixed to the windshield 66 of cab 60, at a height just under the line of sight of a tractor driver 68, looking at sight arm 26 (see FIGS. 8–9). For those tractors which have no windshield 66, lamp assembly 70 may be mounted to the top of hood 56.

Lamp assembly 70 includes a lower housing 72 having a pair of mounting brackets 74 projecting therefrom for mounting assembly 70 to windshield 66. Lower housing 72 is elongated and is mounted generally horizontally on windshield 66 so as to be parallel to housing 13 of sight apparatus 12. The top surface 76 has a recessed channel 78 formed longitudinally therein which will support an elongated light strip 80 thereon. Light strip 80 has a length less than channel 78, such that strip 80 may be slidably adjusted longitudinally therein. A slot 82 centered in channel 78 will receive a wing nut 84, to fasten light strip 80 in position. Slot 82 also permits electrical wires depending from light sockets 80, to project within housing 72, and allow for slidable adjustment thereof.

Wires 86 extend from lamp sockets 88 mounted along the upper surface of light strip 80. Sixteen lamp sockets 88 are uniformly spaced along strip 80, and hold electrical lamps L1 through L16 therein. As will be discussed hereinbelow, lamps L1 through L16 correspond with the sixteen positions of sight arm 26. A clear upper housing 92 is mounted on lower housing 72, to protect lamps L1 through L16 from the weather. An electrical cord 94 containing electrical wires 86 extends out one end of lower housing 72 and is electrically connected to an electrical circuit 96 (see FIG. 5).

The third component of the electrical centerline sight 10 is the switch panel 100. Switch panel 100 includes a housing 102 which is mounted directly below lamp assembly 70 in cab 60. A set of sixteen on/off switches S1 through S16 are mounted in a forward wall 104, which correspond with lamps L1 through L16 and contacts C1 through C16, as described hereinbelow. Each switch S1 through S16 is electrically connected to an electrical circuit 106 (see FIG. 5) via electrical cord 108 extending from housing 102.

Figure 5:
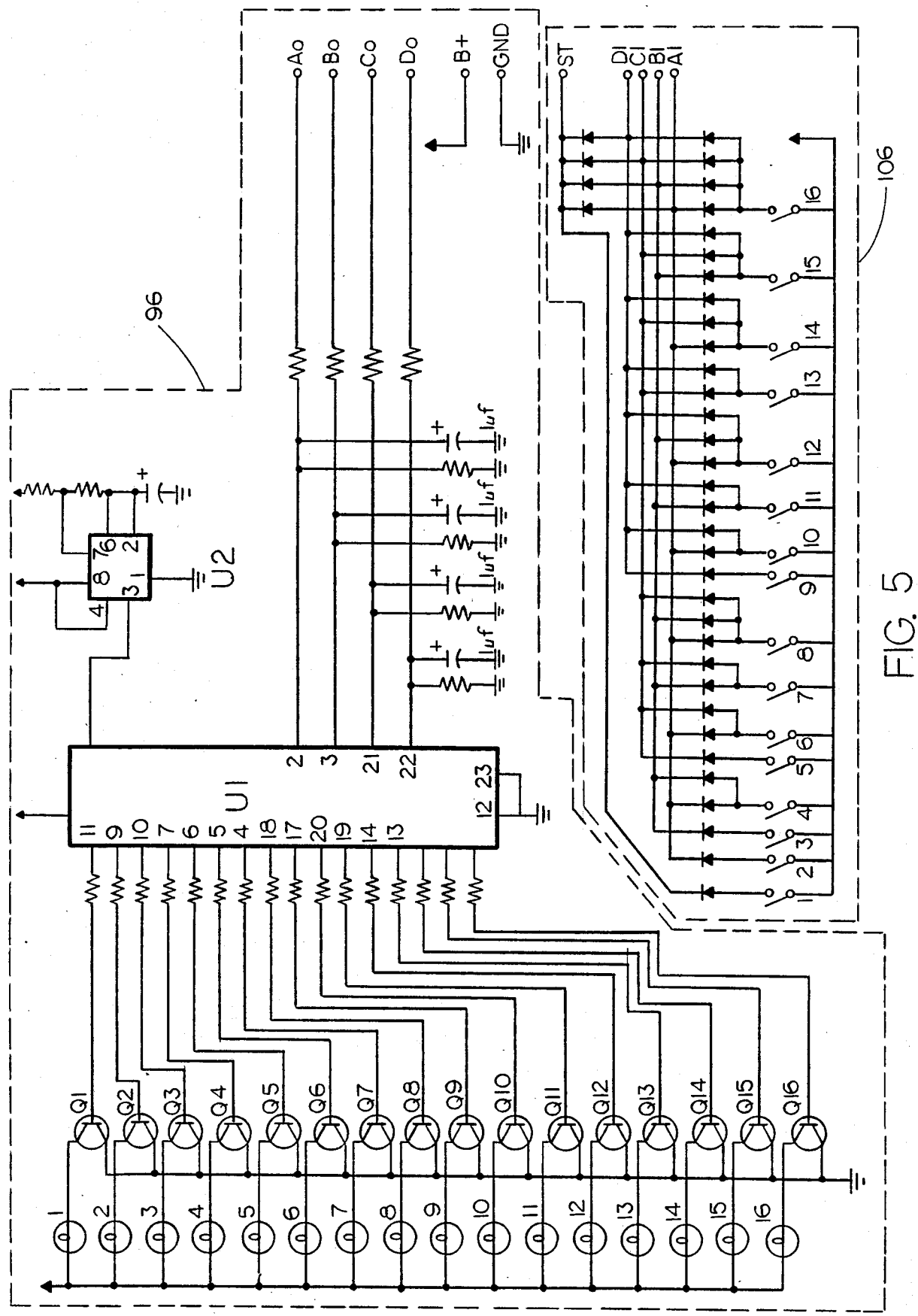
FIG. 5 is an electrical schematic of the switch selector apparatus and the light selector apparatus.
Figure 6:
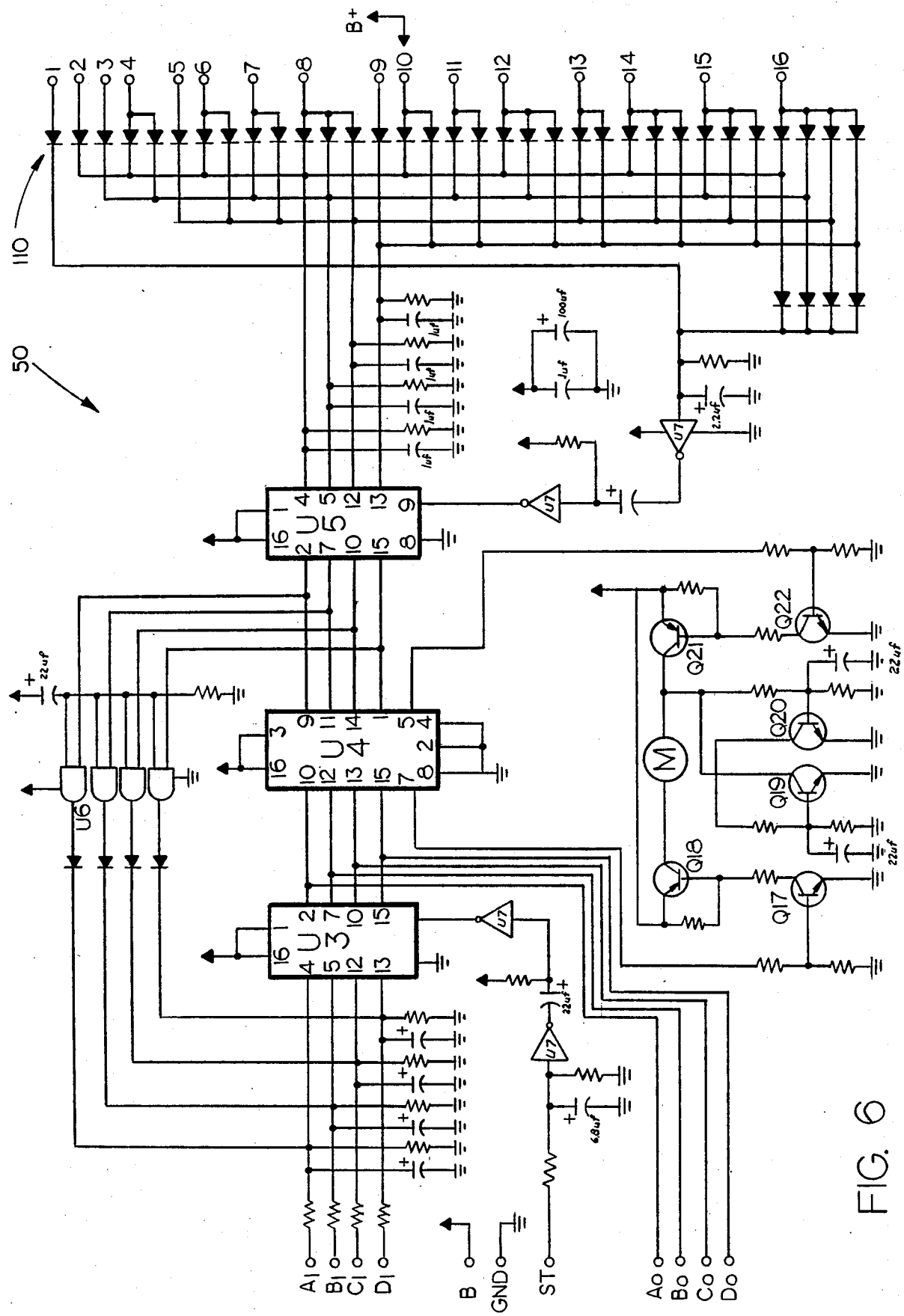
FIG. 6 is an electrical schematic of the laterally adjustable sighting device.

Referring now to FIGS. 5 and 6, an electrical schematic is shown, illustrating the preferred apparatus for electrically connecting sight apparatus 10, lamp assembly 70 and switch panel 100. In general, the activation of a switch S1 through S16 will operate motor 38 in sight apparatus 12 so as to move side arm 26 to a position—identified by contacts C1 through C16—corresponding to switch S1 through S16. Simultaneously, the appropriate lamp L1 through L16 will be lighted in response to the switch S1 through S16 which was thrown.

The electrical schematic of FIGS. 5 and 6 is designed so as to compare two numbers—one generated by an actuated switch S1 through S16, and the other generated by the position of sight arm 26 and its contact with contact strips C1 through C16. Motor 38 is operated so as to rotate shaft 34 in one direction or the other, until the two compared numbers are equal.

On power up, the position of sight arm 26 is decoded into a binary number by a diode matrix 110 in electrical circuit 50. It can be seen that electrical current flows from power supply cord 52 to contact arm 46 and through the arm into contact strip C1 through C16, which is then passed through diode matrix 110 and stored in integrated circuit U5.

In a similar fashion, upon power up, an actuated switch S1 through S16 will cause an output to be converted into a binary number by a diode matrix 112 in electrical circuit 106, which is stored in integrated circuit U3. IC U3 and IC U5 are connected to a comparator IC U4, which will compare the binary number from U3 with the binary number U5. Comparator U4 will then give either an "equal to" output, a "greater than" output, or a "less than" output. The "less than" output of U4 is connected to transistors Q17, Q18, and Q19, which are turned on thereby, which in turn cause motor 38 to be actuated in the "forward" mode so as to move the sight arm 26 towards end 18a of housing 13. This will cause the binary number decoded from contacts C1 through C16 to increase as contact arm 46 is electrically connected to each subsequent strip C1 through C16. Once the binary number from U5 is equal to the binary number from U3, comparator U4 will given an "equal to" output which deactivates motor 38.

Similarly, if binary number from U5 is greater than the binary number from U3, then a "greater than" output is transmitted. The "greater than" output terminal of U4 is connected to transistors Q20, Q21 and Q22, which are turned on, which in turn cause motor 38 to be actuated in the "reverse" mode so as to move the side arm towards 18b of housing 13. Once the binary number from U5 is lowered so as to be equal to binary number from U3, comparator U4 will give "equal to" output which deactivates motor 38.

Lamps L1 through L16 are electrically connected to IC U1, which is connected to U3, such that the appropriate lamp L1 through L16 will be illuminated in response to the actuation of a switch S1 through S16. An additional IC U6 gates the binary number from U5 to U3, so that compared to U4 gives an "equal to" output upon power up.

The operation of the electrical centerline sight 10 of the present invention will be described with reference to FIGS. 7 and 9. Referring first to the detailed illustration of FIG. 7, there is shown an operator 68 seated on an operator's seat 116 rearwardly of the centerline sight 10. Operator 68 has a dominate right eye indicated at reference numeral 118. With the operator seated upright, his head is centrally positioned relative to the longitudinal centerline 120 of the tractor and his right eye 118 is therefore somewhat offset from the centerline. If the sight arm 26 is placed in alignment with the tractor centerline 120 as indicated in solid lines in FIG. 7, the line of sight on the operator's dominate eye 118 through sight arm 26 to the first part of the ground which can be seen over housing 13, indicated at point 124, it would appear that the tractor was transversely offset to the left of furrow 122.

FIG. 7 thus illustrates the basic problem with centering a tractor over a guide furrow. A properly seated operator establishing a line of sight through a centered hood ornament may think that his tractor is properly centered over the guide furrow, but because his line of sight is established through one dominate eye rather than through the center of his face, misalignment of the tractor results. This can be corrected by the transversely adjustable sight arm 26 of the centerline sight 10 of the present invention.

To properly initially adjust the centerline sight 10 when first mounted on the tractor, the tractor is maneuvered to a position centered over ground furrow 122, and the sight arm 26 is set on a particular number position—for example "six". The operator then seats himself on operator seat 116 and adjusts the light strip 80 to a transverse position such that the same number lamp (L6 in this case) as the position number intersects the line of sight between the operator's dominate eye 118 and the ground furrow 122. The operator need only secure the light strip in its adjusted position and then proceed to advance the tractor, steering the same to align the lighted lamp with the sight arm and ground furrow.

Because an operator 68 conventionally will not stay in the identical position on seat 116 for an extended period of time, the applicant's previous invention of U.S. Pat. No. 4,401,166 had several limitations. It would be necessary to readjust and reposition the sight arm 26 each time the operator wanted to change position in the seat. Similarly, if a different operator were to use the tractor, the set up of the sight arm and adjustment would be required.

As discussed above, the use of a hood ornament or the like fixed to the center of the hood, would cause the operator to believe the tractor to be rather substantially offset to the left of guide furrow 120. Whereas the distance from the center of an operator's dominate eye to the center of his face is very small, the misalignment of the tractor can be substantially greater because the small offset of the operator's dominate eye is projected over a great distance. This is because the operator's eye may be situated six to ten feet above the ground with the sighting device positioned perhaps six to seven feet in front of the operator. The line of sight from the operator to the sighting arm to ground furrow 122 may intersect the ground furrow at a point thirty to forty feet in front of the tractor.

It is seen in FIG. 7, that the present invention is an important advance over the prior patent, because the operator can automatically adjust the centerline sight 26 by flipping one of switches S1 through S16 on switch panel 100. Once light strip 80 on lamp assembly 70 has been fixed in the appropriate position, it is simply a matter of activating any one of the sixteen switches S1 through S16 and sighting from the illuminated lamp through the sight arm 26 to the furrow 122, to align the tractor over furrow 122. Thus, in FIG. 7, operator 68 would flip switch S5, which would move sight arm 26 to the broken line position indicated at 126. By aligning lamp L5 with sight arm 26 and furrow 122, at the first point of the furrow 128 seen above housing 13, a sight line 130 is utilized, and tractor 54 will be aligned with furrow 122.

Similarly, if a left eye dominate operator were to utilize the same tractor, and preferred to sit on the left hand side of the tractor, this new operator could merely throw the left hand most selector switch, S16. Sight arm 26 would then move to position C16, indicated at 132, and the new operator would sight on sight line 134 from illuminated lamp L16 through sight arm 26 to furrow 122, at point 128, and be assured that the tractor would be aligned. The new operator would not need to concern himself with the initial positioning of the sight apparatus 10 or lamp strip 80, nor would he need to be concerned with the exact positioning of his body with respect to the tractor. The centerline sight 10 automatically sets an appropriate sight line for the operator. In the embodiment disclosed herein, sixteen different sight lines are possible, with the choice being the operator's as to which sight line is most convenient for operating the tractor.

Light strip 80 is adjustable, since the height of tractors vary, therefore the sight lines will vary for each tractor. After initial adjustment, however, the strip need not ever be readjusted on that particualr tractor.

Whereas the invention has been shown and described in connection with the preferred embodiments thereof, it will be understood that many modifications, substitutions and additions may be made which are within the intended broad scope of the claims. Thus, there has been shown and described an improved electronic centerline sight which accomplishes at least all of the above-stated objects.

I claim:

1. In combination:
    A tractor having forward and rearward ends, and a
        forwardly facing operator seat mounted thereon; a
        centerline sight device including:
        a sight arm housing mounted on the forward end of
            said tractor;

a sight arm operably mounted to said housing for transverse movement with respect to the longitudinal axis of the tractor;

motor means within said sight arm housing for selectively moving said sight arm in one transverse direction or the other;

a lamp assembly housing mounted on said tractor forwardly of said seat and rearwardly of said sight arm;

said lamp housing having a plurality of lamps along its top, spaced apart, and oriented transversely to the longitudinal axis of the tractor;

operable control means electrically connecting said lamps with said motor means;

switch means associated with each said lamp, electrically connected to said control means;

said control means adapted to operate said motor means to move said sight arm to a predetermined position, and to illuminate a predetermined lamp, upon actuation of the associated switch means, such that a line of sight through said illuminated lamp and through said sight arm will intersect a longitudinal marker aligned under the longitudinal centerline of the tractor, whereby the tractor may be maintained in centered relation over the longitudinal marker by steering the tractor to align said marker with said sight line.

2. The combination of claim 1, wherein said tractor further comprises an elongated hood extended forwardly of said operator seat, said sight arm housing being secured to said hood with said sight arm within the line of sight of a tractor operator on said seat.

3. The combination of claim 2, wherein said sight arm is mounted for selectively operable movement from the longitudinal center line of said hood to both sides thereof.

4. The combination of claim 1, wherein said plurality of lamps are mounted on a slidable strip mounted on said lamp assembly housing for selectively slidable movement transverse to the longitudinal axis of the tractor, such that said lamps may be initially mounted on said tractor to correspond with said sight arm.

5. The combination of claim 1, wherein said switch means includes a plurality of switches, one switch corresponding with each of said plurality of lamps, each said switch being electrically connected to said control means, said control means including electrical circuit means for operating said motor means so as to move said sight arm to a predetermined position and illuminate a predetermined lamp, each said switch operable to actuate said sight arm and a corresponding lamp and form a sight line, each said sight line intersecting a longitudinal marker aligned under the longitudinal centerline of the tractor at the same point, whereby a tractor operator may maintain alignment of the tractor with respect to said longitudinal marker along any one of said sight lines.

6. The combination of claim 1, wherein said longitudinal marker is a furrow in a field.

* * * * *